(12) United States Patent
Yasuoka et al.

(10) Patent No.: US 9,509,611 B2
(45) Date of Patent: Nov. 29, 2016

(54) COMMUNICATION SYSTEM, CONGESTION AVOIDANCE METHOD THEREOF, AND METER READING SYSTEM USING COMMUNICATION SYSTEM

(71) Applicant: FUJITSU LIMITED, Kawasaki-shi, Kanagawa (JP)

(72) Inventors: Mitsuaki Yasuoka, Tokyo (JP); Yasuaki Kamimura, Tokyo (JP); Katsumi Kobayashi, Tokyo (JP); Hiroaki Kawasumi, Tokyo (JP); Hiroaki Tamai, Kawasaki (JP); Takafumi Kawakami, Kawasaki (JP); Kazuya Takeuchi, Kawasaki (JP); Shigemasa Matsubara, Tokyo (JP); Akira Okubo, Tokyo (JP); Naoto Miyauchi, Tokyo (JP)

(73) Assignee: FUJITSU LIMITED, Kawasaki-Shi, Kanagawa (JP)

( * ) Notice: Subject to any disclaimer, the term of this patent is extended or adjusted under 35 U.S.C. 154(b) by 89 days.

(21) Appl. No.: 14/383,773
(22) PCT Filed: Mar. 4, 2013
(86) PCT No.: PCT/JP2013/055783
§ 371 (c)(1),
(2) Date: Sep. 8, 2014
(87) PCT Pub. No.: WO2013/133191
PCT Pub. Date: Sep. 12, 2013

(65) Prior Publication Data
US 2015/0103649 A1 Apr. 16, 2015

(30) Foreign Application Priority Data
Mar. 9, 2012 (JP) .................... 2012-053868

(51) Int. Cl.
*H04L 12/801* (2013.01)
*G01D 4/00* (2006.01)
(Continued)

(52) U.S. Cl.
CPC ............. *H04L 47/12* (2013.01); *G01D 4/002* (2013.01); *H04W 48/06* (2013.01); *H04W 84/22* (2013.01); *Y02B 90/241* (2013.01); *Y02B 90/246* (2013.01); *Y04S 20/32* (2013.01); *Y04S 20/42* (2013.01)

(58) Field of Classification Search
None
See application file for complete search history.

(56) References Cited

U.S. PATENT DOCUMENTS

2006/0111796 A1* 5/2006 Van Heteren .......... G01D 4/004
700/20

(Continued)

FOREIGN PATENT DOCUMENTS

JP 2008-066993 A 3/2008
JP 2009-130780 A 6/2009

OTHER PUBLICATIONS

PCT, "International Search Report for International Application No. PCT/JP2013/055783".

*Primary Examiner* — Min Jung
(74) *Attorney, Agent, or Firm* — Manabu Kanesaka

(57) ABSTRACT

The present invention increases accommodation efficiency in a wireless master station for wireless slave stations, and efficiently uses wireless resources while controlling traffic. In a communication system in which a plurality of wireless slave stations 2-1, 2-2, 2-3, . . . , perform wireless communication with wireless master stations 1-1 and 1-2 directly or through another wireless slave station and which performs communication from the wireless master stations with a collection control device 3 by means of wired communication or the like. The collection control device 3 stores first through fourth threshold values a, b, c, and d in memory, and makes efficient use while suppressing traffic by performing a "connection suppression notification", a "specific high-frequency communication stop notification", and an "accommodation refusal notification", and performs functionality control through stages according to the number of accommodated wireless slave stations.

6 Claims, 7 Drawing Sheets

(51) Int. Cl.
*H04W 48/06* (2009.01)
*H04W 84/22* (2009.01)

(56) References Cited

U.S. PATENT DOCUMENTS

2008/0031212 A1 2/2008 Ogura

2010/0007521 A1* 1/2010 Cornwall ................ H04Q 9/00
340/870.02
2012/0092993 A1* 4/2012 Kan ........................ H04L 47/12
370/235
2012/0229296 A1* 9/2012 Ree ........................ G01D 4/002
340/870.02

* cited by examiner

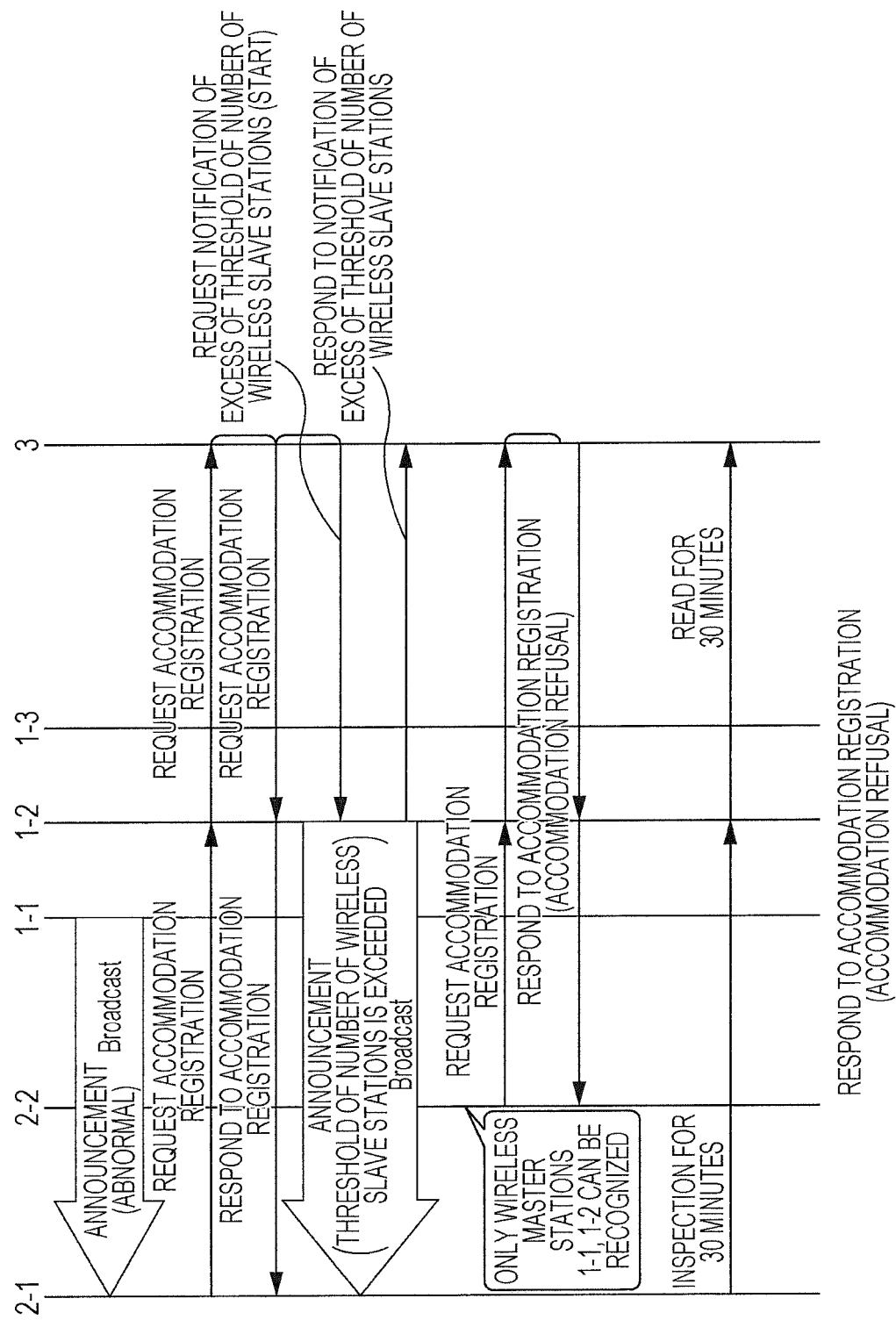

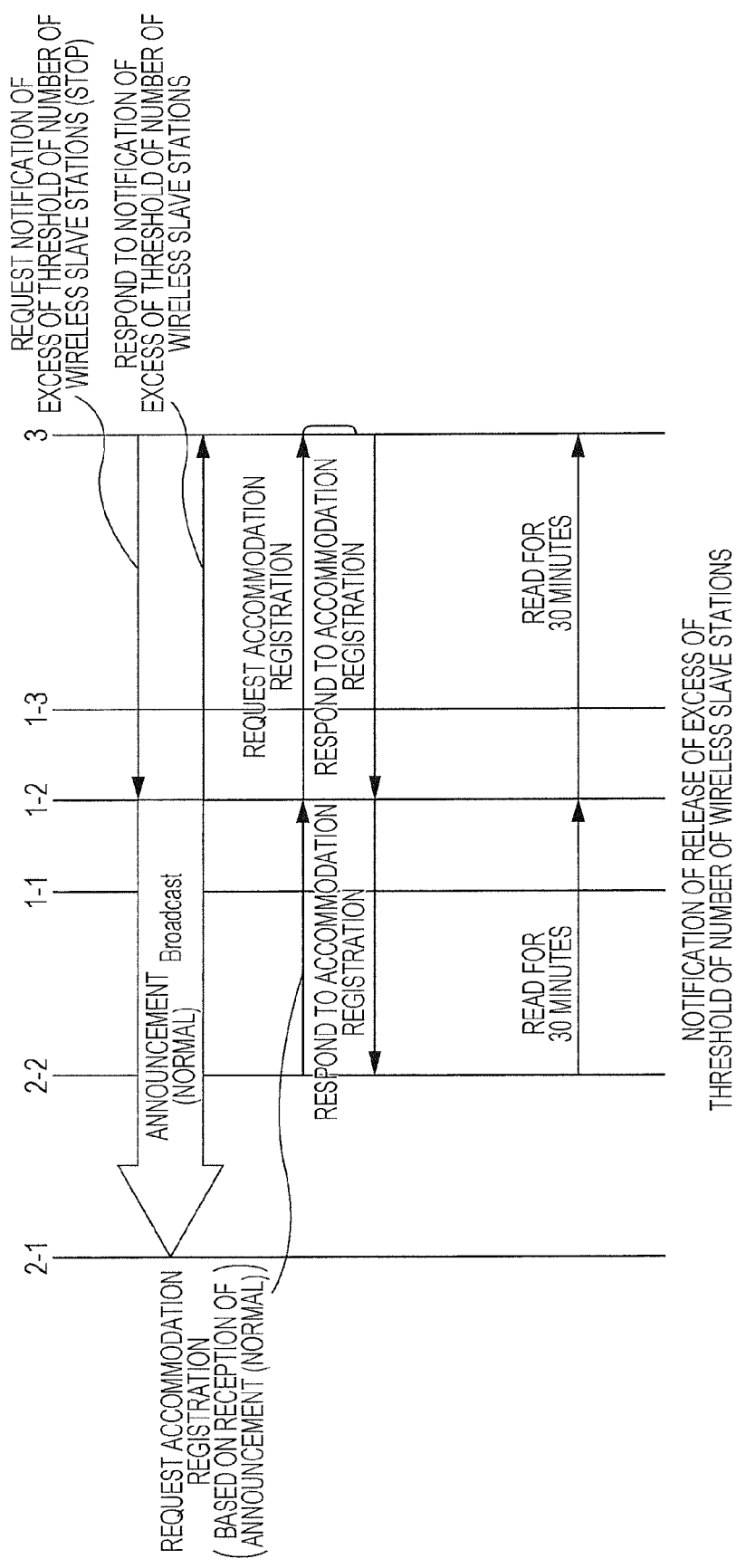

COMMUNICATION SYSTEM, CONGESTION AVOIDANCE METHOD THEREOF, AND METER READING SYSTEM USING COMMUNICATION SYSTEM

RELATED APPLICATIONS

The present application is National Phase of International Application No. PCT/JP2013/055783 filed Mar. 4, 2013, and claims priority from Japanese Application No. 2012-053868, filed Mar. 9, 2012.

TECHNICAL FIELD

The present invention relates to a communication system in which a plurality of wireless slave stations perform wireless communication with wireless master stations directly or through another wireless slave station and which performs communication from the wireless master stations to a collection control device in a wired manner or the like, a congestion avoidance method thereof, and a meter reading system using the communication system.

BACKGROUND ART

In general, a telemetering system that reads the meter of a measuring machine which measures the consumption of electric power, water, gas, or the like through a communication network has been known (for example, see PTL 1). In the telemetering system disclosed in PTL 1, a communication terminal station which is a wireless slave station automatically registers the identification information (Cell Station ID (CSID)) of a relay device which is a wireless master station, and thus labors for operations to install the communication terminal station or to manage inventory are suppressed and mistakes generated when the operation to install the communication terminal station is performed are suppressed.

Generally, in a communication system, if the number of connected wireless slave stations which are subordinate to a specific wireless master station increases, wireless traffic in the vicinity of the wireless master station increases, and thus communication qualities are deteriorated. As a case in which the threshold of the number of accommodations of a wireless master station is exceeded, for example, there is a case in which a plurality of wireless master stations simultaneously enter a stop state due to network failure in a situation in which the wireless master stations are connected to the optical network. If the plurality of wireless master stations stop, existing wireless slave stations circumvent the wireless master stations which are in the stop state, with the result that connections are concentrated in a specific wireless master station, and thus there is a problem in that the threshold of the number of accommodations of the wireless master station is exceeded.

In addition, if a wireless master station is newly installed in a place where a plurality of wireless slave stations are closely installed, the connections of the wireless slave stations are concentrated in the newly installed wireless master station, and thus there is a case in which wireless communication congestion is generated in the vicinity of the newly installed wireless master station.

The telemetering system of PTL 1 discloses a configuration in which, if the number of accommodated wireless slave stations which are subordinate to the wireless master station reaches a threshold, connection of a new wireless slave station is denied, with the result that the number of accommodations is suppressed to be equal to or less than a specific number, and thus deterioration in communication qualities due to increase in traffic in the vicinity of the wireless master station is prevented. Normally, when a wireless slave station newly connects to the wireless master station or changes connection, the wireless slave station transmits a request to connect to the wireless master station to a collection control device through the wireless master station. Therefore, in the invention disclosed in PTL 1, the collection control device monitors the number of wireless slave stations which connect to a specific wireless master station, and controls the number of new connected wireless slave stations which exceeds the threshold.

CITATION LIST

Patent Literature

PTL 1: Japanese Patent No. 4757749

SUMMARY OF INVENTION

Technical Problem

However, in the above-described related art, the collection control device accommodates wireless slave stations which transmit connection requests in order of arrival and the wireless slave stations respectively store two pieces of information about the wireless master station which can be registered. It is unrealistic that a side of the collection control device processes the pieces of information of the wireless master stations, the information being included in the wireless slave stations, in real time, and it is difficult to determine whether or not the wireless slave stations can select another wireless master station as a connection destination. Therefore, according to a situation, such as the arrangement or newly installed order of the wireless slave stations, a state of deteriorated accommodation efficiency is generated in which wireless slave stations which can select another wireless master station are first connected to a specific wireless master station, with the result that it is difficult for the wireless slave stations which can select only the wireless master station to be connected to the wireless master station, and thus it is difficult for the wireless slave stations to be connected to any wireless master station.

In addition, if the number of wireless slave stations registered to a specific wireless master station reaches a specified number, connection permission is not applied to a wireless slave station which newly transmits a request to connect to the wireless master station in order to control the traffic of wireless communication, and thus it is difficult for the wireless slave stations to start communication. That is, after a specific registered number is exceeded, the wireless slave stations which newly transmit the request to connect are caused to stop performing all functions which are provided by the system. As a result, low traffic communication, such as low-frequency regular communication or irregular downlink communication, collectively stops, thereby being inefficient.

The present invention has been made in consideration of the above problems, and an object of the invention is to provide a communication system, a congestion avoidance method thereof, and a meter reading system using the communication system, which increases accommodation efficiency of wireless master stations for wireless slave stations and can be effectively used while controlling traffic.

Solution to Problem

In order to solve the above problems, the present invention provides a communication system, in which a plurality of wireless slave stations perform wireless communication with wireless master stations directly or through another wireless slave station and which performs communication with a collection control device through the wireless master stations. The collection control device includes a first storage section that manages the number of accommodated wireless slave stations which are accommodated in each wireless master station, and a second storage section that stores first to fourth thresholds which are used to determine the number of accommodated wireless slave stations which are accommodated in the wireless master station. The collection control device is configured to announce a connection suppression notification to adjacent wireless slave stations through the wireless master station when a request to connect to a specific wireless master station is received from a wireless slave station and the number of connected wireless slave stations which are subordinate to the wireless master station is equal to or greater than the first threshold, to transmit a specific high-frequency communication stop notification to the wireless slave station when the number of connected wireless slave stations is equal to or greater than the second threshold, which is greater than the first threshold, and less than the third threshold, to transmit an accommodation refusal notification to the wireless slave station when the number of connected wireless slave stations is equal to or greater than the third threshold which is greater than the second threshold, and to announce a connection suppression release notification to the adjacent wireless slave stations through the wireless master station when the number of connected wireless slave stations is equal to the first threshold or less than the fourth threshold, which is lower than the first threshold, after the connection suppression notification is announced.

In addition, a wireless slave station, which receives the connection suppression notification transmitted from the collection control device and does not have a determined connection destination, may transmit the request to connect to the specific wireless master station when it is difficult to select another wireless master station, and may transmit a request to connect to another wireless master station when it is possible to select another wireless master station, a wireless slave station, which receives the specific high-frequency communication stop notification, may stop specific high-frequency communication, and may continue to respond to specific low-frequency communication and downlink communication from the collection control device, a wireless slave station, which receives the accommodation refusal notification, may stop the specific low-frequency communication, and may continue to respond to the downlink communication from the collection control device, and a wireless slave station, which receives the connection suppression release notification, may release a restriction of transmission of the request to connect to the wireless master station.

In addition, the respective first and second storage sections may be rewritable.

In addition, each of the plurality of wireless slave stations may include a third storage section that stores identification information of the wireless master station in which the wireless slave station is accommodated, and the identification information of the wireless master station may be written based on path construction information which is regularly transmitted from the wireless master station and wireless master station status information which is supplied from the collection control device through the wireless master station in which the wireless slave station is accommodated.

The present invention provides a congestion avoidance method of a communication system, in which a plurality of wireless slave stations perform wireless communication with wireless master stations directly or through another wireless slave station and which performs communication with a collection control device through the wireless master stations, including: announcing a connection suppression notification to adjacent wireless slave stations from the collection control device through the wireless master station when a request to connect to a specific wireless master station is received from the wireless slave station and the number of connected wireless slave stations, which are subordinate to the wireless master station, is equal to or greater than a first threshold; transmitting the request to connect to the wireless master station when it is difficult to select another wireless master station, and transmitting a request to connect to another wireless master station when it is possible to select another wireless master station by a wireless slave station which receives the connection suppression notification and does not have a determined connection destination; transmitting a specific high-frequency communication stop notification from the collection control device to the wireless slave station when the request to connect to the specific wireless master station is received from the wireless slave station and when number of connected wireless slave stations, which are subordinate to the wireless master station, is equal to or greater than a second threshold, which is greater than the first threshold, and less than a third threshold; stopping the specific high-frequency communication in a wireless slave station which receives the specific high-frequency communication stop notification, and continuing to respond to specific low-frequency communication and downlink communication from the collection control device; transmitting an accommodation refusal notification from the collection control device to the wireless slave station when the request to connect to the specific wireless master station is received from the wireless slave station and when the number of connected wireless slave stations, which are subordinate to the wireless master station, is equal to or greater than the third threshold which is greater than the second threshold; stopping the specific low-frequency communication in a wireless slave station which receives the accommodation refusal notification, and continuing to respond to the downlink communication from the collection control device; announcing a connection suppression release notification to the adjacent wireless slave stations from the collection control device through the wireless master station when the number of accommodated wireless slave stations, which are subordinate to the specific wireless master station, is equal to the first threshold or less than a fourth threshold, which is lower than the first threshold, after the connection suppression notification is announced; and releasing restriction of transmission of the request to connect to the wireless master station from a wireless slave station which receives the connection suppression release notification.

In addition, the present invention provides a meter reading system including: a plurality of measurement devices; wireless slave stations that are provided in the respective measurement devices and configured to wirelessly transmit measured values; and a collection control device that is configured to collect the measured values through wireless master stations which accommodate the plurality of wireless slave stations, and is configured to control the plurality of wireless slave stations selectively through the plurality of wireless master stations. The plurality of wireless slave stations perform wireless communication with the wireless master stations directly or through another wireless slave station, and communication is performed with the collection control device through the wireless master stations, the collection control device includes a first storage section that manages the number of accommodated wireless slave stations which are accommodated in each wireless master station, and a second storage section that stores first to fourth thresholds which are used to determine the number of accommodated wireless slave stations which are accommodated in the wireless master station, the collection control device is configured to announce a connection suppression notification to adjacent wireless slave stations through the wireless master station when a request to connect to a specific wireless master station is received from a wireless slave station and a number of connected wireless slave stations which are subordinate to the wireless master station is equal to or greater than the first threshold, to transmit a specific high-frequency communication stop notification to the wireless slave station when the number of connected wireless slave stations is equal to or greater than the second threshold, which is greater than the first threshold, and less than the third threshold, to transmit an accommodation refusal notification to the wireless slave station when the number of connected wireless slave station is equal to or greater than the third threshold which is greater than the second threshold, and to announce a connection suppression release notification to the adjacent wireless slave stations through the wireless master station when the number of connected wireless slave stations is equal to the first threshold or less than the fourth threshold, which is lower than the first threshold, after the connection suppression notification is announced, a wireless slave station, which receives the connection suppression notification transmitted from the collection control device and does not have a determined connection destination, transmits the request to connect to the specific wireless master station when it is difficult to select another wireless master station, and transmits a request to connect to another wireless master station when it is possible to select another wireless master station, a wireless slave station, which receives the specific high-frequency communication stop notification, stops specific high-frequency communication, and continues to respond to specific low-frequency communication and downlink communication from the collection control device, a wireless slave station, which receives the accommodation refusal notification, stops the specific low-frequency communication, and continues to respond to the downlink communication from the collection control device, and a wireless slave station, which receives the connection suppression release notification, releases a restriction of transmission of the request to connect to the wireless master station.

Advantageous Effects of Invention

In the present invention, the collection control device detects the excess of the number of connected wireless slave stations in advance, which are subordinate to the specific wireless master station, and provides notification to the wireless slave stations. Therefore, a wireless slave station which can select another wireless master station changes a transmission destination of the request to connect to another wireless master station, and thus it is possible to increase accommodation efficiency. In addition, the connection suppression notification, the specific high-frequency communication stop notification, the accommodation refusal notification, and functionality control through stages are performed according to the number of connected wireless slave stations which are subordinate to the specific wireless master station, and thus it is possible to effectively use system capacity while controlling traffic.

In addition, the respective first and second storage sections are rewritable, and thus it is possible to freely set the number of accommodated wireless slave stations which are accommodated in each wireless master station and the first to fourth thresholds.

Further, the third storage section of the wireless slave station stores the wireless master station in which the wireless slave station is accommodated, and thus it is possible to easily respond to change of the wireless master station which is an accommodation destination.

Therefore, it is possible to increase accommodation efficiency of the wireless master station for the wireless slave station, and thus the communication system which can be effectively used while controlling traffic, the congestion avoidance method thereof, and the meter reading system using the communication system are acquired.

BRIEF DESCRIPTION OF DRAWINGS

FIG. 6 is a diagram illustrating a function to respond to the accommodation registration request with an accommodation refusal in the congestion avoidance method of the meter reading system according to the embodiment of the present invention.

FIG. 7 is a diagram illustrating a function of the wireless slave station to receive release of the excess of the threshold of the number of wireless slave stations from the wireless master station and to perform accommodation registration in the congestion avoidance method of the meter reading system according to the embodiment of the present invention.

DESCRIPTION OF EMBODIMENTS

Hereinafter, embodiments of the present invention will be described with reference to the accompanying drawings.

Figure 1:
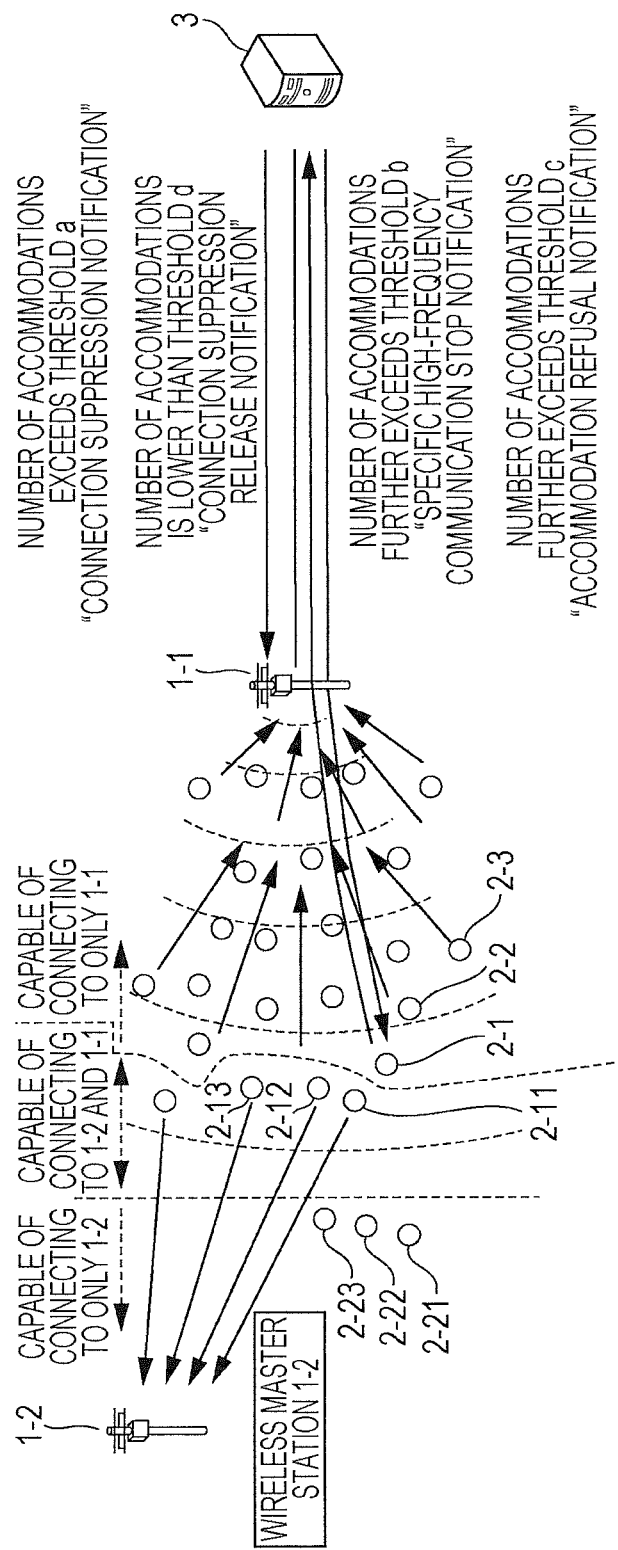
FIG. 1 is a diagram illustrating a communication system and a congestion avoidance method thereof according to an embodiment of the present invention.
Figure 2:
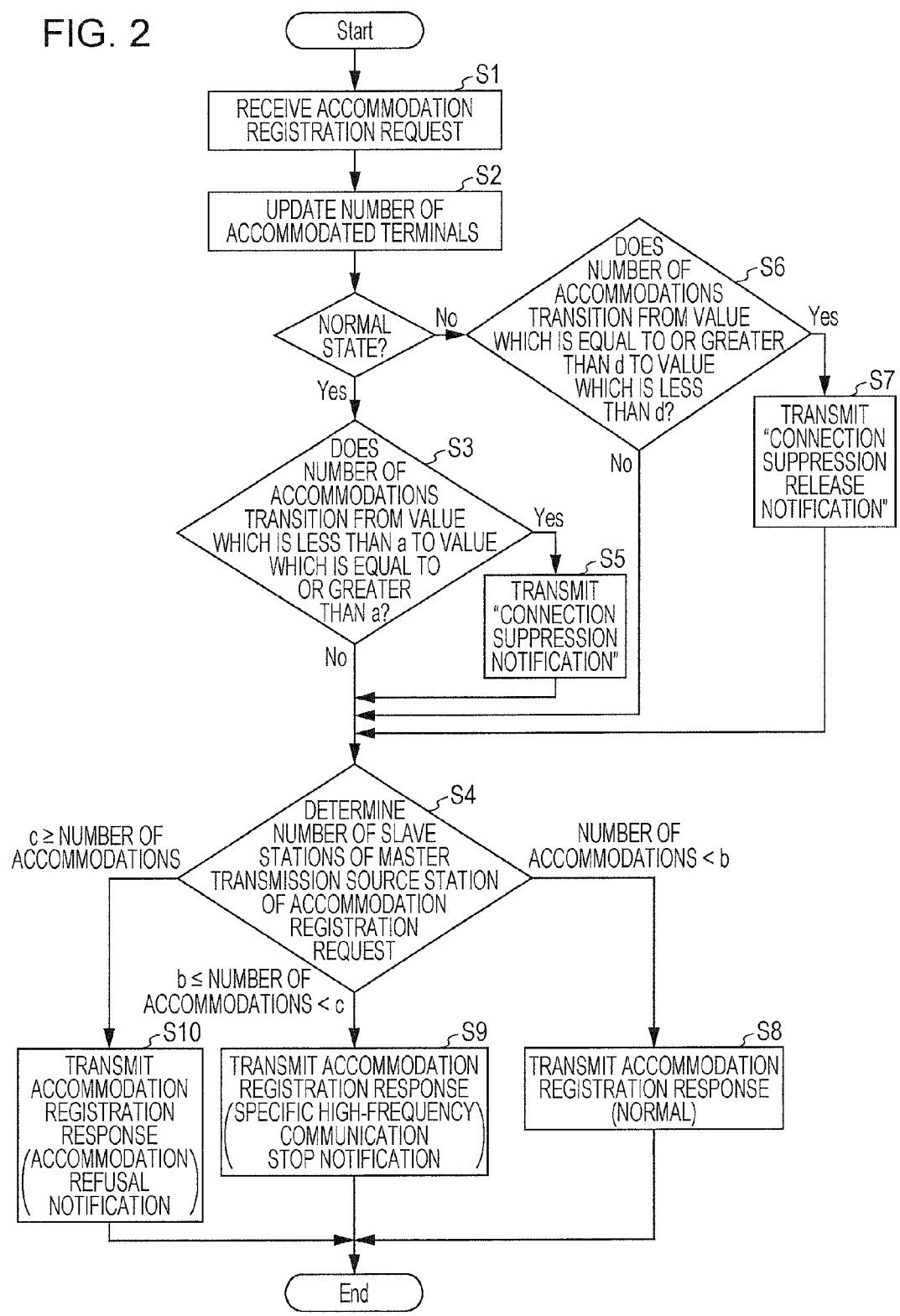
FIG. 2 is a flowchart illustrating an operation of a collection control device of the communication system shown in FIG. 1.

FIG. 1 is a block diagram illustrating a communication system and a congestion avoidance method thereof according to an embodiment of the present invention. In FIGS. 1, 1-1 and 1-2 refer to wireless master stations, ○ marks refer to wireless slave stations which are capable of communicating with the wireless master stations, and 3 refers to a collection control device. In FIG. 1, the wireless slave stations which are expressed by ◯ marks are capable of communicating with each other, and form a mesh-type network which performs communication between the respective wireless slave stations. Each of the wireless slave stations determines which of the adjacent wireless slave stations or wireless master stations is used to transmit information based on path construction information, which is received from the adjacent wireless slave stations or the wireless master stations, or the like, and autonomously selects a communication path.

A wireless master station, which can communicate with the wireless slave station, changes based on the number of hops from the wireless master station 1-1 and the wireless master station 1-2, a communication situation, and the like, and wireless slave stations 2-1, 2-2, and 2-3 which are capable of communicating with only the wireless master station 1-1, wireless slave stations 2-11, 2-12, and 2-13 which are capable of communicating with both the wireless master station 1-1 and the wireless master station 1-2, and wireless slave stations 2-21, 2-22, and 2-23 which are capable of communicating with only the wireless master station 1-2 are representatively shown. The wireless master station 1-1 and the wireless master station 1-2 communicate with the collection control device 3 by means of wired communication or the like.

Each of the wireless slave stations, which are shown by ◯ marks in FIG. 1, maintains identification information relative to the wireless master station, to which information should be transmitted, in ranked order in the form of main and auxiliary forms. For example, the wireless slave stations 2-1, 2-2, and 2-3 store identification information of the wireless master station 1-1, the wireless slave stations 2-11, 2-12, and 2-13 store identification information of the wireless master station 1-1 and the wireless master station 1-2, and the wireless slave stations 2-21, 2-22, and 2-23 store identification information of the wireless master station 1-2 in a rewritable storage device (third storage section), such as a semiconductor memory or a hard disk, and transmit data to a main wireless master station. The identification information is used in order for the wireless slave stations to determine a wireless master station which can perform communication based on path construction information which is regularly transmitted from the wireless master stations 1-1 and 1-2 and wireless master station status information which is collected from the collection control device 3 through an accommodated wireless master station, and is stored in the storage device.

Further, for example, each of the wireless master stations 1-1 and 1-2 accommodates hundreds of wireless slave stations 2-1, 2-2, 2-3, . . . , 2-11, 2-12, 2-13, . . . , 2-21, 2-22, 2-23, . . . , and becomes an integrated place for the wireless slave stations 2-1, 2-2, 2-3, . . . , 2-11, 2-12, 2-13, . . . , 2-21, 2-22, 2-23, . . . . The wireless master stations 1-1 and 1-2 easily accommodate the wireless slave stations 2-1, 2-2, 2-3, . . . , 2-11, 2-12, 2-13, . . . , 2-21, 2-22, 2-23, . . . in places where wireless communication qualities are excellent, and each of the wireless slave stations determines a transmission path according to the wireless communication qualities between the wireless slave stations, which are adjacent to the wireless slave station, or between the wireless master stations, and is finally integrated to the wireless master station by hopping from a wireless slave station to another wireless slave station.

In contrast, the collection control device 3 manages and monitors the number of wireless slave stations 2-1, 2-2, 2-3, . . . , 2-11, 2-12, 2-13, . . . , 2-21, 2-22, 2-23, . . . through the wireless master stations 1-1 and 1-2, previously detects the excess of the number of connected wireless slave stations which are subordinate to a specific wireless master station, and provides notification of the excess of the number of connected wireless slave stations to the wireless slave stations 2-1, 2-2, 2-3, . . . , 2-11, 2-12, 2-13, . . . , 2-21, 2-22, 2-23, . . . . Therefore, the collection control device 3 causes the wireless slave stations 2-11, 2-12, 2-13, . . . which are capable of selecting another wireless master station, to change a transmission destination of a request to connect to another wireless master station. In addition, the collection control device 3 provides a "connection suppression notification", a "specific high-frequency communication stop notification", and an "accommodation refusal notification", and performs functionality control through stages according to the number of wireless slave stations which are subordinate to the wireless master station.

In addition, the collection control device 3 stores a plurality of thresholds in a rewritable storage device (second storage section), such as a semiconductor memory or a hard disk, as parameters in system units or wireless master station units, and performs gradual communication control as below. Here, in FIG. 1, it is assumed that a first threshold is a, a second threshold is b, a third threshold is c, and a fourth threshold is d. The thresholds have a relationship of d<a<b≤c. Further, when the threshold b is equivalent to the threshold c, a process with regard to the threshold c is first performed.

An operation of the collection control device 3 is shown in a flowchart in FIG. 2. If the collection control device 3 receives an accommodation registration request from a wireless master station (S1), update of the number of accommodated terminals which is stored in the collection control device 3, in other words, update of the number of connected wireless slave stations which are subordinate to the wireless master station (S2), is performed. Further, determination of whether or not a normal state is transitioned to a suppression state (S3), determination of whether or not the suppression state is transitioned to the normal state (S6), and determination of the number of accommodated wireless slave stations (S4) are performed. FIG. 2 shows the flow in which, after determination of whether or not the normal state is transitioned to the suppression state (S3) or determination of whether or not the suppression state is transitioned to the normal state (S6) is performed, determination of the number of accommodated wireless slave stations (S4) is performed. However, after the update of the number of accommodated terminals (S2) is performed, the process in S4 may be performed before the process in S3 or S6 is performed or may be performed independently.

When a current state is the normal state, determination of whether or not the normal state is transitioned to the suppression state (S3) is performed based on whether or not the number of accommodated terminals is transitioned from a value, which is less than the threshold a, to a value which is equal to or greater than the threshold a. When the number of accommodated terminals is equal to or greater than the threshold a, a "connection suppression notification" is simultaneously transmitted to the wireless slave stations which are subordinate to the wireless master station in a broadcast manner (S5). The "connection suppression notification" is announced to the subordinate wireless slave stations through the wireless master station. Here, the announcement means information of which notification is simultaneously provided in the broadcast manner. Meanwhile, if a state is transitioned to the suppression state once, the connection suppression notification is not provided even though the number of accommodated terminals is equal to or greater than the threshold a. In addition, if the number of accommodated terminals is greater than the threshold a and the state is transitioned to the suppression state once, the state does not return to the normal state unless the number of accommodated terminals is less than the threshold d. Therefore, the state is transitioned from the suppression state to a state in which the number of accommodated terminals is equal to or greater than the threshold d and is less than the threshold a. Even when the number of accommodated terminals is equal to or greater than the threshold a again, the state is not transitioned to the suppression state.

When the current state is the suppression state, determination of whether or not the suppression state is transitioned to the normal state (S6) is performed based on whether or not the number of accommodated terminals is transitioned from a value which is equal to or greater than the threshold d to a value which is less than the threshold d. When the number of accommodated terminals is less than the threshold d, a "connection suppression release notification" is simultaneously transmitted to the wireless slave stations which are subordinate to the wireless master station in the broadcast manner (S7). The wireless slave stations which receive the "connection suppression release notification" are capable of transmitting a request to connect to the wireless master station. In addition, the "connection suppression release notification" can be realized by announcing a signal indicative of the normality of the wireless master station. When the number of accommodated terminals is equal to or greater than the threshold d, a connection suppression state is maintained.

In contrast, when the number of accommodated terminals is less than the threshold b in step S4, it is determined that the wireless slave station can be accommodated, with the result that an accommodation registration response (normal) is transmitted (S8), and thus the accommodation registration response is provided from a wireless slave station which does not include a determined connection destination to the wireless slave station through the wireless master station which receives the accommodation registration request. If the number of accommodated terminals is equal to or greater than the threshold b in step S4, high-frequency communication stop determination is performed. In the determination, when the threshold is a value which is equal to or greater than the threshold b and is less than c, an accommodation registration response (specific high-frequency communication stop notification) is transmitted (S9). A wireless slave station, which receives the accommodation registration response (specific high-frequency communication stop notification) stops specific high-frequency communication, and continues to respond to specific low-frequency communication and downlink communication from the collection control device 3.

When the number of accommodated terminals is equal to or greater than the threshold c in step S4, an accommodation registration response (accommodation refusal notification) is transmitted (S10). A wireless slave station which receives the accommodation registration response (accommodation refusal notification) stops specific low-frequency communication but continues to respond to the downlink communication from the collection control device 3. Further, after steps S8, S9, and S10 are terminated, the process proceeds to a subsequent process.

Table 1 below shows a detailed example of the number of accommodations in the congestion avoidance method according to the embodiment, and shows the overview of the operation in accordance with increase and decrease in the number of accommodations. Here, it is assumed that the thresholds a=800, b=1000, c=5000, and d=700. The threshold (the number of accommodations) can be freely set according to the configuration of the system and necessity, and may be set to a parameter other than the number of accommodations.

TABLE 1

Overview of operation in accordance with increase and decrease in number of accommodations

| Number of accommodations | Operation of correction control device | Operation of wireless slave station |
|---|---|---|
| ... | | |
| 800 | Instruct wireless master station to start connection suppression | Withhold connection to wireless master station from which connection suppression notification is received, or select wireless master station if another selection is not possible |
| 1000 | Respond to existing terminals with 30-minute stop | Existing terminals stop providing notification for 30 minutes |
|  | Reply to new terminal with accommodation refusal | Regular terminal registration is performed |
|  | Not register in collection control device | All new terminals are stopped and registration is invalid |
| 5000 | Reply to existing terminals with accommodation refusal | All of existing terminals are also stopped |
| ... | | |
| 1000 | Respond normally to regular terminal registration from terminals which are stopped for 30 minutes | Terminals, which are stopped for 30 minutes, restart to provide notification for 30 minutes |
|  | Respond normally if new terminal is generated | New terminals perform normal operation |
| 700 | Instruct wireless master station to release connection suppression | Restart to connect to wireless master station which receives normal announcement |

In the communication system and the congestion avoidance method thereof as described above, the collection control device 3 previously detects the increase in the number of connected wireless slave stations 2-1, 2-2, 2-3, . . . , 2-11, 2-12, 2-13, . . . , 2-21, 2-22, 2-23, . . . which are subordinate to the specific wireless master station 1-1 or 1-2, and provides notification of the increase to the wireless slave stations 2-1, 2-2, 2-3, . . . , 2-11, 2-12, 2-13, . . . , 2-21, 2-22, 2-23, . . . . Therefore, the wireless slave stations 2-11, 2-12, 2-13, . . . which are capable of selecting another wireless master station changes the transmission destination of the connection request into another wireless master station, and thus it is possible to increase accommodation efficiency.

In addition, according to the number of accommodated wireless slave stations, the "connection suppression notification", the "specific high-frequency communication stop notification", the "accommodation refusal notification", and the functionality control through stages are performed, and thus it is possible to provide efficient system function while satisfying the object of traffic control.

Basically, it is preferable to apply the present invention to a communication system in which upstream traffic from the plurality of wireless slave stations 2-1, 2-2, 2-3, . . . , 2-11, 2-12, 2-13, . . . , 2-21, 2-22, 2-23, . . . to the wireless master stations 1-1 and 1-2 occupies the most part of the communication system and downstream traffic from the wireless master stations 1-1 and 1-2 to the wireless slave stations 2-1, 2-2, 2-3, . . . , 2-11, 2-12, 2-13, . . . , 2-21, 2-22, 2-23, . . . is less. For example, a system is preferable which performs control by transmitting data, such as values measured by various sensors, from the wireless slave stations 2-1, 2-2, 2-3, . . . , 2-11, 2-12, 2-13, . . . , 2-21, 2-22, 2-23, . . . to the wireless master stations 1-1 and 1-2 at high frequency and by transmitting data, such as control information, from the wireless master stations 1-1 and 1-2 to the wireless slave stations 2-1, 2-2, 2-3, . . . , 2-11, 2-12, 2-13, . . . , 2-21, 2-22, 2-23, . . . at a low frequency.

EXAMPLE

Subsequently, as a detailed example of the above-described communication system and the congestion avoidance method thereof according to the embodiment, a meter reading system which measures power consumption will be described in detail.

Figure 3:
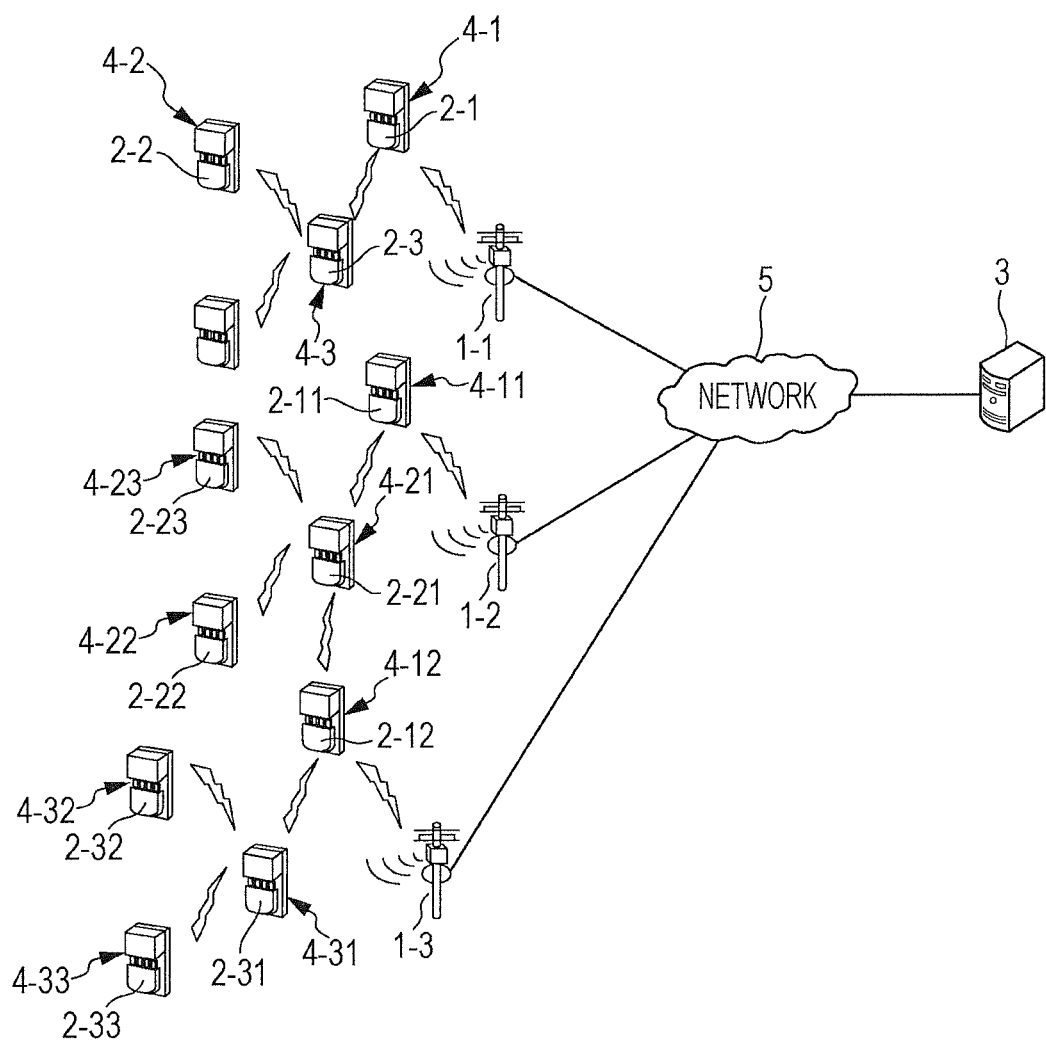
FIG. 3 is a diagram illustrating a meter reading system for power consumption according to the embodiment of the present invention.

FIG. 3 is a diagram illustrating a meter reading system for power consumption according to an example of the present invention. Measurement devices 4-1, 4-2, 4-3, . . . , 4-11, 4-12, . . . , 4-21, 4-22, 4-23, . . . , 4-31, 4-32, 4-33, . . . , which measure power consumption, are provided with the wireless slave stations (communication units) 2-1, 2-2, 2-3, . . . , 2-11, 2-12, . . . , 2-21, 2-22, 2-23, . . . , 2-31, 2-32, 2-33, . . . , respectively. The wireless slave stations 2-1, 2-2, 2-3, . . . , 2-11, 2-12, . . . , 2-21, 2-22, 2-23, . . . , 2-31, 2-32, 2-33, . . . are configured to be able to communicate with each other and are subordinate to the wireless master stations 1-1, 1-2, and 1-3 which are installed on telegraph poles. The wireless master stations 1-1, 1-2, and 1-3 are connected to the collection control device 3 through a network 5 which is formed of optical fibers.

The meter reading system includes a function to monitor the number of wireless slave stations using the collection control device 3 in order to avoid congestion.

The function to monitor the number of wireless slave stations using the collection control device 3 is performed in such a way that the collection control device 3 limits the number of accommodated wireless slave stations for each wireless master station or the communication operations of the wireless slave stations by managing the number of accommodated wireless slave stations for each wireless master station, thereby preventing congestion from being generated.

Subsequently, the function to monitor the number of wireless slave stations using the collection control device 3 will be described.

(1) Function to Request the Wireless Master Stations 1-1, 1-2, and 1-3 to Transmit an Announcement (Excess of the Threshold of the Number of Wireless Slave Stations)

The collection control device 3 manages and monitors the number of wireless slave stations, and requests that the wireless master stations 1-1, 1-2, and 1-3 transmit the announcement (excess of the threshold of the number of wireless slave stations) using a request of a notification of the excess of the threshold of the number of wireless slave stations (start). The wireless master stations 1-1, 1-2, and 1-3 return a response to the collection control device 3, and regularly transmit the announcement (excess of the threshold of the number of wireless slave stations) which provides the notification that the number of accommodated wireless slave stations exceeds the threshold.

The wireless slave stations 2-1, 2-2, 2-3, . . . , 2-11, 2-12, . . . , 2-21, 2-22, 2-23, . . . , 2-31, 2-32, 2-33, . . . which receive the announcement (excess of the threshold of the number of wireless slave stations) do not newly select the wireless master station 1-1, 1-2, or 1-3 which is a transmission source of the announcement as an accommodation destination. When there is not another wireless master station to be selected, the wireless master station 1-1, 1-2, or 1-3 may be selected. In addition, a wireless slave station, which selects the wireless master station as an accommodation destination in advance before the announcement is received, may continuously select the wireless master station.

Figure 4:
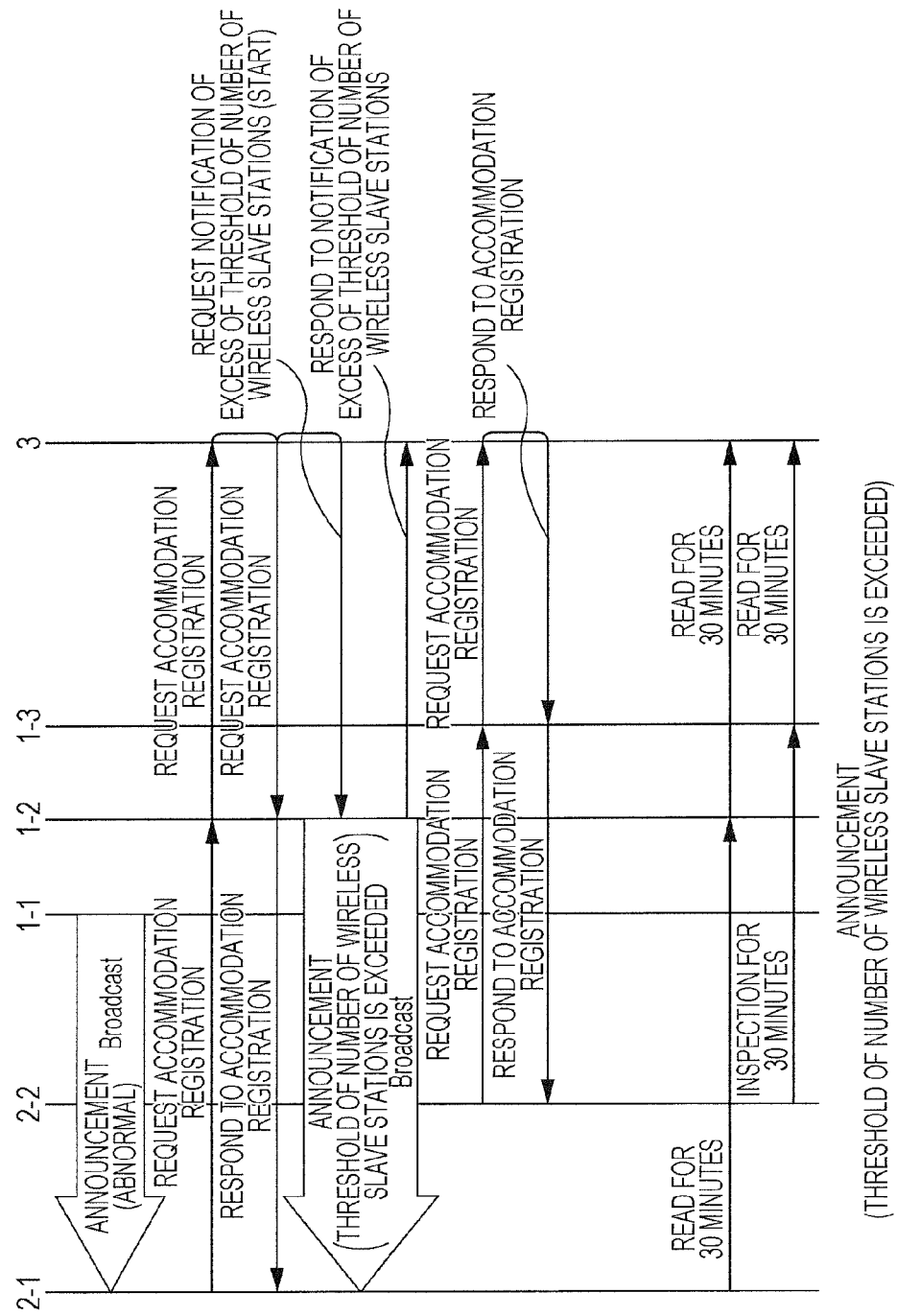
FIG. 4 is a diagram illustrating a function to request a wireless master station to transmit an announcement (excess of a threshold of the number of wireless slave stations) in a congestion avoidance method of the meter reading system according to the embodiment of the present invention.

FIG. 4 shows an operation, as a result that the wireless master station 1-1 is abnormal and a plurality of wireless slave stations select the wireless master station 1-2 as a primary station, including:

(a) detecting the excess of the threshold of the number of wireless slave stations by the collection control device 3;

(b) transmitting a message to request the notification of the excess of the threshold of the number of wireless slave stations (start) to the wireless master station 1-2;

(c) regularly transmitting the announcement (the excess of the threshold of the number of wireless slave stations) in a broadcast transmission manner by the wireless master station 1-2; and (d) selecting the wireless master station 1-3 as the primary station instead of selecting the wireless master station 1-2 as the primary station by the wireless slave station 2-12, and transmitting an accommodation registration request.

That is, if each of the subordinate wireless slave stations is informed that the wireless master station 1-1 is abnormal, the wireless slave station 2-1 transmits the accommodation registration request to another wireless master station 1-2, and the accommodation registration request is provided from the wireless master station 1-2 to the collection control device 3. In contrast, the collection control device 3 transmits an accommodation registration response to the wireless master station 1-2, and the accommodation registration response is provided from the wireless master station 1-2 to the wireless slave station 2-1.

In addition, the request of the notification of the excess of the threshold of the number of wireless slave stations (start)

is transmitted from the collection control device 3 to the wireless master station 1-2, and the response of the notification of the excess of the threshold of the number of wireless slave stations is transmitted from the wireless master station 1-2 to the collection control device 3. Further, if the number of wireless slave stations, which are subordinate to the wireless master station 1-2, increases and exceeds the threshold, an announcement is output to each of the wireless slave stations, which are subordinate to the Wireless master station 1-2, under the control of the collection control device 3. In response to this, the wireless slave station 2-2 transmits the accommodation registration request to the wireless master station 1-3, and the accommodation registration request is provided from the wireless master station 1-3 to the collection control device 3. In contrast, the collection control device 3 transmits the accommodation registration response to the wireless master station 1-3, the accommodation registration response is provided from the wireless master station 1-3 to the wireless slave station 2-2, and thus the wireless slave station 2-2 is registered in the wireless master station 1-3.

A measurement value acquired through reading for 30 minutes (hereinafter, referred to as for 30 minutes) is transmitted from the wireless slave stations 2-1 and 2-2 to the collection control device 3 through the wireless master stations 1-2 and 1-3.

(2) Function to Respond to Accommodation Registration Request with Instruction to Stop for 30 Minutes The collection control device 3 can return a response to stop for 30 minutes with regard to the accommodation registration requests which are received from the wireless slave stations 2-1, 2-2, 2-3, . . . , 2-11, 2-12, . . . , 2-21, 2-22, 2-23, . . . , 2-31, 2-32, 2-33, . . . .

The wireless slave stations 2-1, 2-2, 2-3, . . . , 2-11, 2-12, . . . , 2-21, 2-22, 2-23, . . . , 2-31, 2-32, 2-33, . . . , which receive the response to stop for 30 minutes, suppress the transmission of the accommodation registration request until an announcement (normal) is received. In addition, transmission is stopped for 30 minutes until the accommodation registration request is transmitted and a normal response is received.

Figure 5:
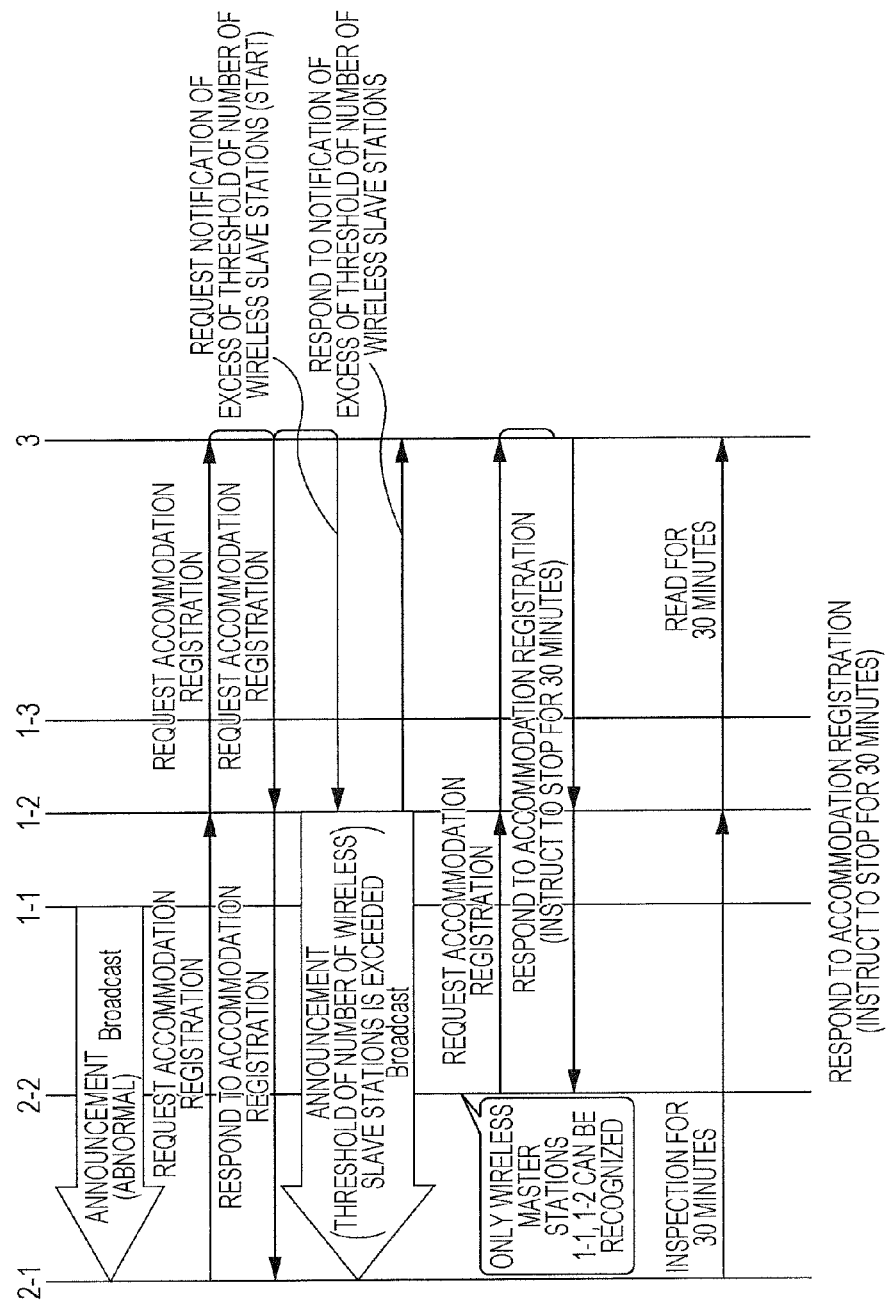
FIG. 5 is a diagram illustrating a function to respond to an accommodation registration request with an instruction to stop for 30 minutes in the congestion avoidance method of the meter reading system according to the embodiment of the present invention.

FIG. 5 shows an operation, as a result that the wireless master station 1-1 is abnormal and the plurality of wireless slave stations select the wireless master station 1-2 as a primary station, including:
(a) detecting the excess of the threshold of the number of wireless slave stations by the collection control device 3;
(b) transmitting a request of the notification of excess of the threshold of the number of wireless slave stations (start) to the wireless master station 1-2;
(c) regularly transmitting an announcement (excess of the threshold of the number of wireless slave stations) by the wireless master station 1-2 in a broadcast transmission manner;
(d) selecting the wireless master station 1-2 as the primary station because the wireless slave station 2-2 can recognize only the wireless master stations 1-1 and 1-2, and transmitting the accommodation registration request; and
(e) transmitting the accommodation registration response (instruction to stop for 30 minutes) by the collection control device 3 because the number of accommodations exceeds the number of notification-permitted terminals for 30 minutes.

(3) Function to Respond to Accommodation Registration Request with Accommodation Refusal The collection control device 3 can return an accommodation registration response (accommodation refusal) with regard to the accommodation registration requests which are received from the wireless slave stations 2-1, 2-2, 2-3, . . . , 2-11, 2-12, . . . , 2-21, 2-22, 2-23, . . . 2-31, 2-32, 2-33, . . . .

A wireless slave station which receives the accommodation registration response (accommodation refusal) suppresses transmission of the accommodation registration request until the announcement (normal) is received. When the announcement (normal) is received, the wireless slave station, which receives the accommodation refusal as the accommodation registration response, restarts from the accommodation registration request. In addition, transmission stops for 30 minutes until the accommodation registration request is transmitted and a normal response is received. Further, another low frequency upstream communication is suppressed until the accommodation registration request is transmitted and a response other than the accommodation refusal is received.

FIG. 6 shows an operation, as a result that the wireless master station 1-1 is abnormal and the plurality of wireless slave stations select the wireless master station 1-2 as the primary station, including:
(a) detecting the excess of the threshold of the number of wireless slave stations by the collection control device 3;
(b) transmitting a request of the notification of the excess of the threshold of the number of wireless slave stations (start) to the wireless master station 1-2;
(c) regularly transmitting an announcement (excess of the threshold of the number of wireless slave stations) in the broadcast transmission manner by the wireless master station 1-2;
(d) selecting the wireless master station 1-2 as the primary station because the wireless slave station 2-11 can recognize only the wireless master stations 1-1 and 1-2, and transmitting the accommodation registration request; and
(e) transmitting the accommodation registration response (accommodation refusal) by the collection control device because the number of accommodations exceeds the number of accommodation-permitted terminals.

(4) Function to Request Wireless Master Station to Transmit Announcement (Normal)

The collection control device 3 manages and monitors the number of wireless slave stations, and requests the wireless master stations 1-1, 1-2, and 1-3 to transmit the announcement (normal) using the request of the notification of the excess of the threshold of the number of wireless slave stations (stop) when the release of the excess of the threshold of the number of wireless slave stations is determined. The wireless master stations 1-1, 1-2, and 1-3 return a response to the collection control device 3, and regularly transmit the announcement (normal). The wireless slave stations 2-1, 2-2, 2-3, . . . , 2-11, 2-12, . . . , 2-21, 2-22, 2-23, . . . , 2-31, 2-32, 2-33, . . . , which receive the announcement (normal) can select the received wireless master station as the primary or subordinate stations regardless that another wireless master station to be selected is present.

FIG. 7 shows an operation, as a result that a plurality of wireless slave stations, which change the primary station from the wireless master station 1-2 to another wireless master station, are generated, including:

(a) detecting that the wireless master station 1-2 releases the excess of the threshold of the number of wireless slave stations by the collection control device 3;
(b) transmitting a message, which requests notification of the excess of the threshold of the number of wireless slave stations (stop), to the wireless master station 1-2;
(c) regularly transmitting the announcement (normal) in the broadcast transmission manner by the wireless master station 1-2; and
(d) selecting the wireless master station 1-2 as the primary station and transmitting the accommodation registration request by the wireless slave station 2-2.

When the collection control device 3 detects the excess of the threshold of the number of wireless slave stations by (d) selecting the wireless master station 1-2 as the primary station and transmitting the accommodation registration request by the wireless slave station 2-2, the announcement (excess of the threshold of the number of wireless slave stations) is transmitted by performing the operations which are described with reference to FIG. 4. In addition, with regard to the operation of (d), the collection control device can transmit the response to stop for 30 minutes and the accommodation refusal response.

As described above, according to the present invention, it is possible to increase accommodation efficiency of the wireless master station for the wireless slave stations, and the communication system which can be effectively used while controlling traffic, the congestion avoidance method thereof, and the meter reading system using the communication system can be acquired.

Meanwhile, in the above-described example, the meter reading system which reads power consumption has been described as an example. However, the present invention can be applied to a system which reads the amount of consumed gas, water, or the like in the same manner. In addition, the present invention can be widely applied to a case in which it is desired to secure traffic for urgent communication in, for example, a wireless terminal such as a mobile phone.

REFERENCE SIGNS LIST

1-1, 1-2, 1-3 WIRELESS MASTER STATION
2-1, 2-2, 2-3, . . . , 2-11, 2-12, 2-13, . . . , 2-21, 2-22, 2-23, . . . WIRELESS SLAVE STATION
3 COLLECTION CONTROL DEVICE
4-1, 4-2, 4-3, . . . MEASUREMENT DEVICE
5 NETWORK
a, b, c, d THRESHOLD

The invention claimed is:

1. A communication system, in which a plurality of wireless slave stations performs wireless communication with wireless master stations directly or through another wireless slave station and performs communication with a collection control device through the wireless master stations,
   wherein the collection control device includes a first storage section that manages a number of the wireless slave stations which are accommodated in each wireless master station, and a second storage section that stores first to fourth thresholds which are used to determine the number of the wireless slave stations which are accommodated in the wireless master station, and
   wherein the collection control device is configured to announce a connection suppression notification to adjacent wireless slave stations through the wireless master station when a request to connect to a specific wireless master station is received from a wireless slave station and a number of connected wireless slave stations which are subordinate to the wireless master station is equal to or greater than the first threshold, to transmit a specific high-frequency communication stop notification to the adjacent wireless slave stations when the number of connected wireless slave stations is equal to or greater than the second threshold, which is greater than the first threshold, and less than the third threshold, to transmit an accommodation refusal notification to the wireless slave station when the number of connected wireless slave stations is equal to or greater than the third threshold which is greater than the second threshold, and to announce a connection suppression release notification to the adjacent wireless slave stations through the wireless master station when the number of connected wireless slave stations is equal to the first threshold or less than the fourth threshold, which is lower than the first threshold, after the connection suppression notification is announced.

2. The communication system according to claim 1,
   wherein a wireless slave station, which receives the connection suppression notification transmitted from the collection control device and does not have a determined connection destination, transmits the request to connect to the specific wireless master station when the wireless slave station is unable to select another wireless master station, and transmits a request to connect to another wireless master station when the wireless slave station is able to select another wireless master station,
   wherein a wireless slave station, which receives the specific high-frequency communication stop notification, stops specific high-frequency communication, and continues to respond to specific low-frequency communication and downlink communication from the collection control device,
   wherein a wireless slave station, which receives the accommodation refusal notification, stops the specific low-frequency communication, and continues to respond to the downlink communication from the collection control device, and
   wherein a wireless slave station, which receives the connection suppression release notification, releases a restriction of transmission of the request to connect to the wireless master station.

3. The communication system according to claim 1,
   wherein the respective first and second storage sections are rewritable.

4. The communication system according to claim 1,
   wherein each of the plurality of wireless slave stations includes a third storage section that stores identification information of the wireless master station which the wireless slave station is accommodated, and the identification information of the wireless master station is written based on path construction information which is regularly transmitted from the wireless master station, and wireless master station status information which is supplied from the collection control device through the wireless master station in which the wireless slave station is accommodated.

5. A congestion avoidance method of a communication system, in which a plurality of wireless slave stations performs wireless communication with wireless master stations directly or through another wireless slave station and performs communication with a collection control device through the wireless master stations, comprising:

announcing a connection suppression notification to adjacent wireless slave stations from the collection control device through the wireless master station when a request to connect to a specific wireless master station is received from the wireless slave station and a number of connected wireless slave stations, which are subordinate to the wireless master station, is equal to or greater than a first threshold;

transmitting the request to connect to the wireless master station when it is unable to select another wireless master station, and transmitting a request to connect to another wireless master station when it is able to select another wireless master station by a wireless slave station which receives the connection suppression notification and does not have a determined connection destination;

transmitting a specific high-frequency communication stop notification from the collection control device to the adjacent wireless slave stations when the request to connect to the specific wireless master station is received from the wireless slave station and when the number of connected wireless slave stations, which are subordinated to the wireless master station, is equal to or greater than a second threshold, which is greater than the first threshold, and less than a third threshold;

stopping the specific high-frequency communication in a wireless slave station which receives the specific high-frequency communication stop notification, and continuing to respond to specific low-frequency communication and downlink communication from the collection control device;

transmitting an accommodation refusal notification from the collection control device to the wireless slave station when the request to connect to the specific wireless master station is received from the wireless slave station and when the number of connected wireless slave stations, which are subordinate to the wireless master station, is equal to or greater than the third threshold which is greater than the second threshold;

stopping the specific low-frequency communication in a wireless slave station which receives the accommodation refusal notification, and continuing to respond to the downlink communication from the collection control device;

announcing a connection suppression release notification to the adjacent wireless slave stations from the collection control device through the wireless master station when the number of accommodated wireless slave stations, which are subordinate to the specific wireless master station, is equal to the first threshold or less than a fourth threshold, which is lower than the first threshold, after the connection suppression notification is announced; and releasing restriction of transmission of the request to connect to the wireless master station from a wireless slave station which receives the connection suppression release notification.

6. A meter reading system comprising:

a plurality of measurement devices;

wireless slave stations that are provided in the respective measurement devices and configured to wirelessly transmit measured values; and a collection control device that is configured to collect the measured values through wireless master stations which accommodate the plurality of wireless slave stations, and is configured to control the plurality of wireless slave stations selectively through the plurality of wireless master stations, wherein the plurality of wireless slave stations perform wireless communication with the wireless master stations directly or through another wireless slave station, and communication is performed with the collection control device through the wireless master stations, wherein the collection control device includes a first storage section that manages a number of the wireless slave stations which are accommodated in each wireless master station, and a second storage section that stores first to fourth thresholds which are used to determine the number of the wireless slave stations which are accommodated in the wireless master station, wherein the collection control device is configured to announce a connection suppression notification to adjacent wireless slave stations through the wireless master station when a request to connect to a specific wireless master station is received from a wireless slave station and a number of connected wireless slave stations which are subordinate to the wireless master station is equal to or greater than the first threshold, to transmit a specific high-frequency communication stop notification to the adjacent wireless slave stations when the number of connected wireless slave stations is equal to or greater than the second threshold, which is greater than the first threshold, and less than the third threshold, to transmit an accommodation refusal notification to the wireless slave station when the number of connected wireless slave stations is equal to or greater than the third threshold which is greater than the second threshold, and to announce a connection suppression release notification to the adjacent wireless slave stations through the wireless master station when the number of connected wireless slave stations is equal to the first threshold or less than the fourth threshold, which is lower than the first threshold, after the connection suppression notification is announced, wherein a wireless slave station, which receives the connection suppression notification transmitted from the collection control device and does not have a determined connection destination, transmits the request to connect to the specific wireless master station when the wireless slave station is unable to select another wireless master station, and transmits a request to connect to another wireless master station when the wireless slave station is able to select another wireless master station, wherein a wireless slave station, which receives the specific high-frequency communication stop notification, stops specific high-frequency communication, and continues to respond to specific low-frequency communication and downlink communication from the collection control device, wherein a wireless slave station, which receives the accommodation refusal notification, stops the specific low-frequency communication, and continues to respond to the downlink communication from the collection control device, and wherein a wireless slave station, which receives the connection suppression release notification, releases a restriction of transmission of the request to connect to the wireless master station.

* * * * *